3,194,818
ALPHA-ARYL OR ARALKYL FURFURYLAMINES
Robert L. Clarke, Bethlehem, N.Y., assignor to Sterling Drug Inc., New York, N.Y., a corporation of Delaware
No Drawing. Filed Aug. 14, 1963, Ser. No. 301,993
3 Claims. (Cl. 260—347.7)

This is a continuation-in-part of application Serial No. 141,644, filed September 29, 1961, now abandoned, which in turn was a division of application Serial No. 116,666, filed June 13, 1961, now U.S. Patent 3,091,621 granted May 28, 1963, which in turn was a continuation-in-part of application Serial No. 836,343, filed August 27, 1959, and now abandoned.

This invention relates to new amines which possess pharmacological activity. More particularly, the invention relates to $\alpha$-substituted tetrahydrofurfurylamines, intermediates therefor, and to methods for the preparation of these compounds.

A large number of phenylalkylamines are known which have an oxygen atom beta to the amino nitrogen, particularly as a hydroxyl group. According to the present invention new and useful compounds are obtained when an oxygen atom beta to the amino nitrogen of alicyclic or aryl substituted alkylamines is in the form of an ether and positioned in a side chain.

Among the compounds within the scope of the invention are those having in the free base form, the general formula

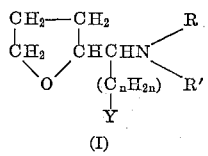

(I)

wherein R is a member selected from the group consisting of hydrogen and lower-alkyl having from one to six carbon atoms; R' is a member selected from the group consisting of hydrogen, lower-alkyl having from one to six carbon atoms, cycloalkyl having from three to seven ring carbon atoms, oxaalkylene having from three to eight carbon atoms, benzyl, and benzyl substituted by from one to two members selected from the group consisting of lower-alkyl, lower-alkoxy, halogen and amino; Y is a member selected from the group consisting of cycloalkyl having from three to seven ring carbon atoms, naphthyl, phenyl and phenyl substituted by from one to two members selected from the group consisting of lower-alkyl, lower-alkoxy, halogen and amino; and $n$ is a number from 0 to 2.

The free bases of Formula I react with organic and inorganic acids to form acid-addition salts which are the full equivalent of the free bases.

When Y and R' in the above general Formula I are respectively phenyl and benzyl substituted by from one to two lower-alkyl, lower-alkoxy, or halogen groups the halogen can be fluorine, chlorine, bromine or iodine and the lower-alkyl and lower-alkoxy groups can contain from one to about six carbon atoms including for example, methyl, ethyl, propyl, isopropyl, butyl, isobutyl, tertiary-butyl, pentyl, isopentyl, hexyl, isohexyl and the like for lower-alkyl and methoxy, ethoxy, propoxy, isopropoxy, butoxy, tert.-butoxy, pentoxy, isopentoxy, hexoxy, etc. for lower-alkoxy. The halogen, lower-alkyl and lower-alkoxy groups can be present on any of the positions on the phenyl nucleus, and where more than one, can be the same or different and can be in any of the various position combinations relative to each other as, for example, 4-iodophenyl, 4-iodobenzyl, 2-chlorophenyl, 2-chlorobenzyl, 4-bromophenyl, 4-bromobenzyl, 3-ethylphenyl, 3-ethylbenzyl, 4-n-hexoxyphenyl, 4-n-hexoxybenzyl, 4-isopropylphenyl, 4-isopropylbenzyl, 2,6-dimethylphenyl, 2,6-dimethylbenzyl, 3-fluorophenyl, 3-fluorobenzyl, 3,4-dipropoxyphenyl, 3,4-dipropoxybenzyl, 3-chloro-4-methylphenyl, 3-chloro-4-methylbenzyl, 3,5-dibromophenyl, 3,5-dibromobenzyl and the like.

The R and R' in the above general Formula I when lower-alkyl can have from one to about six carbon atoms and thus include for example, methyl, ethyl, propyl, isopropyl, butyl, sec.-butyl, amyl, isoamyl, hexyl, isohexyl etc.

The Y and R' in the above general Formula I when cycloalkyl can have from three to seven ring carbon atoms and hence comprehend for example, cyclopropyl, cyclobutyl, cyclopentyl, cyclohexyl, cycloheptyl, 2,6-dimethylcyclohexyl, 2,2,4,4-tetramethylcyclobutyl and the like.

When R' in the above general Formula I represents oxaalkylene it includes for example,

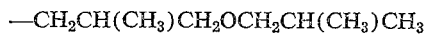

and the like.

The grouping $C_nH_{2n}$, where $n$ is a number from 1 to 2 represents a lower-alkylene bridge between the group Y and the alpha carbon of the tetrahydrofurfurylamine and includes for example, methylene, —CH$_2$—, ethylene, —CH$_2$CH$_2$—, and ethylidene, CH$_3$CH=. When $n$ is 0 there are no carbon atoms intervening between the group Y and the alpha carbon of the tetrahydrofurfurylamine which in this case are directly joined.

The invention also comprehends compounds having, in the free base form, the general formula

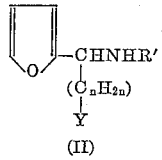

(II)

wherein Y, R' and $n$ have the meanings given above, said compounds being useful as intermediates for the preparation of the compounds of Formula I (R=H) as will be seen hereinafter.

It is to be understood that the compounds of Formula II, like those of Formula I, react with organic and inorganic acids to form acid-addition salts which are the full equivalent of the free bases.

The compounds of the present invention having the Formula I (R=H) may be prepared by dissolving compounds of Formula II in a solvent inert to the reaction conditions such as, for example, methanol, ethanol, dioxane, or the like, and subjecting the resulting solution to hydrogenation at super-atmospheric pressure in the presence of a Raney nickel catalyst at from about 25–60° C., preferably at about room temperature. The hydrogenation of the furfurylamines to the tetrahydrofurfurylamines takes place in from one to about six hours at hydrogen pressure of about 1500 p.s.i. On distillation of the reaction mixture, the solvent is removed and the tetrahydrofurfurylamines are obtained as oils. To prepare acid-addition salts thereof, the tetrahydrofurfurylamine is dissolved in a suitable solvent, as for example, acetone ethyl acetate, ether, etc., and an alcoholic solution of a desired acid, as for example, hydrogen chloride, sulfuric acid, phosphoric acid and the like, added thereto to obtain the corresponding acid-addition salt of the tetrahydrofurfurylamine.

The intermediate compounds having the general Formula II can be prepared by adding an appropriate furfurylidenealkylamine to a Grignard reagent Y-Mg-halogen in an anhydrous solvent as for example ether. The reaction is carried out at a temperature between about 35° C. to about 70° C. and, if a solvent is selected which boils in this range, it is preferable to carry out the reaction at the reflux temperature. The reaction mixture is hydrolyzed with acid, the solvent separated and the furfurylamines obtained by steam distillation followed by ether extraction and distillation.

The N,N-disubstituted compounds can be prepared by conventional alkylation procedures from the compounds of Formula I or II.

The acid-addition salts of the bases herein described are the form in which the bases are most conveniently prepared for use and are the full equivalents of the subject matter specifically claimed. The acid moieties or anions in these salt forms are in themselves neither novel nor critical and therefore can be any acid anion or acid-like substance capable of salt formation with the free base form of the compounds. The preferred type of salts are water-soluble pharmacologically acceptable salts, that is, salts whose anions are relatively innocuous to the animal organism in pharmacological doses of the salts, so that the beneficial physiological properties inherent in the free base are not vitiated by side effects ascribable to the anions; in other words, the latter do not substantially affect the pharmacological properties inherent in the cations. In practicing the invention, it has been found convenient to form the hydrochloride salt. However, other appropriate pharmaceutical acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, quinic acid, and the like, giving the hydrobromide, hydriodide, nitrate, phosphate, sulfamate, sulfate, acetate, citrate, tartrate, lactate, methanesulfonate, ethanesulfonate and quinate, respectively.

Although pharmacologically acceptable salts are preferred, those having toxic anions are also useful. All acid-addition salts are useful as intermediates in purification sources of the free base form even if the particular salt per se is not desired as the final product, as for example when the salt is formed only for purposes of purification or identification, or when it is used as an intermediate in preparing a pharmacologically acceptable salt by ion exchange procedures.

It will be understood that the quaternary ammonium salts, like the acid-addition salts, possess the same structural nucleus as the bases, and the structure of the bases thus constitutes the common characteristic feature of the three forms of the compounds of the invention.

The quaternary ammonium salts are obtained by the addition of lower-alkyl, lower-alkenyl or monocarbocyclic arylmethyl esters of inorganic acids or organic sulfonic acids having a molecular weight less than about 200 to the free base form of Formula I. Thus the esters include lower-alkyl containing from one to six carbon atoms, lower-alkenyl containing from three to six carbon atoms and monocarbocyclic arylmethyl containing seven to twelve carbon atoms. The quaternizing esters, which form a well known class in the quaternary ammonium art, include such compounds as methyl chloride, methyl bromide, methyl iodide, ethyl bromide, propyl chloride, n-hexyl chloride, allyl chloride, allyl bromide, methyl sulfate, methyl benzenesulfonate, methyl p-toluenesulfonate, benzyl chloride, benzyl bromide, p-nitrobenzyl chloride, m-methoxybenzyl bromide, p-isopropylbenzyl chloride, o-chlorobenzyl chloride, and the like.

Compounds of this invention which were prepared as described in the following examples were found to produce psychomotor stimulation like that produced by amphetamine with greatly lessened cardiovascular effects. Thus, when tested in mice by a modification of the method of Dews, they were found to increase the spontaneous activity of the animals. In this test procedure mice were placed in an activity cage through which a beam of light passed and impinged on a photoelectric cell so adjusted that a mouse breaking the light path activated a magnetic counter. Representative compounds of the invention, each dissolved in distilled water, were administered intraperitoneally to mice in groups of five and the number of interruptions of the light beam was recorded for a thirty minute period. The data obtained were recorded as threshold dose, dose producing maximum effect, maximum "count" and the ratio of the maximum count to that of water controls. The threshold dose and the ratio of maximum count to control count respectively for each of the indicated compounds were as follows: α-Benzyltetrahydrofurfurylamine hydrochloride, 8 mg./kg., 1.83; dl-erythro-N - methyl - α - benzyltetrahydrofurfurylamine hydrochloride, 4 mg./kg., 3.27; dl-threo-N-methyl-α-benzyltetrahydrofurfurylamine, 2 mg./kg., 4.13; N-methyl - α - phenyltetrahydrofurfurylamine hydrochloride, 8 mg./kg., 3.51; dl-erythro-N - ethyl - α - benzyltetrahydrofurfurylamine hydrochloride, 2 mg./kg., 3.70; dl-thero-N-ethyl - α - benzyltetrahydrofurfurylamine hydrochloride, 1 mg./kg., 3.97; N-isopropyl - α - benzyltetrahydrofurfurylamine, 4 mg./kg., 3.18; N-ethyl - α - (3,4-dichlorobenzyl)tetrahydrofurfurylamine, 2 mg./kg., 4.50; N-methyl - α - (4 - methylbenzyl)tetrahydrofurfurylamine, 16 mg./kg., 2.88; N-cyclopropyl - α - benzyltetrahydrofurfurylamine, 8 mg./kg., 3.94; dl-thero-N-ethyl-α-benzyltetrahydrofurfurylamine, 1 mg./kg., 4.50; and N-propyl-α-benzyltetrahydrofurfurylamine, 4 mg./kg., 3.18.

The structure of the compounds of the invention is established by the mode of synthesis and by chemical analysis.

The following examples will illustrate the invention without limiting the latter thereto.

EXAMPLE 1

(a) N-methyl-α-phenylfurfurylamine

To a Grignard reagent prepared from 47 g. of bromobenzene and 8.4 g. of magnesium in 300 ml. of ether was added a solution of 25 g. of furfurylidenemethylamine in 75 ml. of anhydrous ethyl ether. The mixture was refluxed for one hour, then treated with 250 ml. of 4 N hydrochloric acid. The water layer was separated and made strongly alkaline with 35% sodium hydroxide then subjected to steam distillation. The distillate was extracted 3 times with ether and the combined ether extracts were dried over anhydrous sodium sulfate. After the ether was removed by distillation the residual oil was distilled to give 20 g. of N-methyl-α-phenylfurfurylamine, B.P. 125–128° C./8 mm.

*Anal.*—Calcd. for $C_{12}H_{13}NO$: N, 7.48. Found: N, 7.47.

(b) N-methyl-α-phenyltetrahydrofurfurylamine

A solution of 15 g. N-methyl-α-phenylfurfurylamine in 70 ml. of anhydrous ethanol was hydrogenated at room temperature in the presence of W–4 Raney nickel. The reduction required 1½ hours under a hydrogen pressure of approximately 1500 lbs. The catalyst and solvent were removed by filtration under reduced pressure and the residual oil treated with 50 ml. of ether and 16 ml. of 5.5 N ethereal hydrochloric acid. The solid which precipitated was recrystallized from 800 ml. of acetonitrile to give 5.2 g. of a higher melting isomer of N-methyl-α-phenyltetrahydrofurfurylamine, M.P. 238–239.5° C. (corr.). Concentration of the acetonitrile filtrate to a 10 ml. volume followed by dilution with 20 ml. of ether gave 3.6 g. of the lower melting isomer of N - methyl - α - phenyltetrahydrofurfurylamine, M.P. 166–169° C. (corr.).

Under the higher melting isomer,

*Anal.*—Calcd. for $C_{12}H_{18}ClNO$: C, 63.29; H, 7.97; Cl, 15.57. Found: C, 63.30; H, 7.91; Cl, 15.66.

Under the lower melting isomer,

*Anal.*—Calcd. for C₁₂H₁₈ClNO: C, 63.29; H, 7.97; Cl, 15.57. Found: C, 63.54; H, 7.74; Cl, 15.67.

EXAMPLE 2

(a) N,N-Dimethyl-α-benzylfurfurylamine

To a solution of 15 g. of N-methyl-α-benzylfurfurylamine in 21 g. of 90% formic acid was added 15 g. of 40% formaldehyde and the mixture heated for one hour at 100° C. The solvents were removed by distillation at reduced pressure and the residue vacuum distilled. There was thus obtained 13.5 g. of N,N-dimethyl-α-benzylfurfurylamine, B.P. 101–103° C./.075–0.25 mm.

The free base was dissolved in 25 ml. of anhydrous ethyl ether and treated with 14 ml. of 5.86 N ethereal hydrochloric acid. The white solid which separated was collected by suction filtration and dried at room temperature. Recrystallization from absolute ethyl alcohol gave white massive prisms of N,N-dimethyl-α-benzylfurfurylamine hydrochloride, M.P. 193–196° C. (corr.).

*Anal.*—Calcd. for C₁₄H₁₈ClNO: C, 66.80; H, 7.21; Cl, 14.09. Found: C, 68.50; H, 6.95; Cl, 13.93.

(b) N,N - dimethyl - α - benzyltetrahydrofurfurylamine was prepared by hydrogenation of 33.2 g. of N,N-dimethyl-α-benzylfurfurylamine in 140 ml. of anhydrous ethanol according to the manipulative procedure described above in Example 1(b). The 16 g. of N,N-dimethyl-α-benzyltetrahydrofurfurylamine thus obtained was converted to the hydrochloride by treatment with 15 ml. of 5 N ethereal hydrochloric acid. The N,N-dimethyl-α-abenzyltetrahydrofurfurylamine hydrochloride thus obtained had the M.P. 201–205° C. (corr.).

*Anal.*—Calcd. for C₁₄H₂₂ClNO: C, 65.73; H, 8.67; Cl, 13.86. Found: C, 65.87; H, 8.36; Cl, 13.72.

Treatment of the above free base with methyl iodide in acetonitrile gave heavy white needles of N,N-dimethyl-α-benzyltetrahydrofurfurylamine methiodide, M.P. 157–177° C. (corr.).

EXAMPLE 3

(a) N,α-dibenzylfurfurylamine

The Grignard reagent prepared by refluxing 114 g. of benzyl chloride and 26.7 g. of magnesium powder in 600 ml. of ethyl ether for two hours was treated with 112.5 g. of furfurylidenebenzylamine in 500 ml. of ethyl ether. The mixture was refluxed for one hour then left standing overnight. Hydrolysis with 800 ml. of 2 N hydrochloric acid caused the separation of a solid which was collected by suction filtration then made strongly alkaline with 2 N sodium hydroxide. The solid material which separated was shown to be N-benzyl-α-phenylethylamine hydrochloride by comparison with an authentic sample, M.P. 249–252° C.

*Anal.*—Calcd. for C₂₁H₂₂ClN: C, 77.87; H, 6.85; Cl, 10.95; N, 4.32. Found: C, 77.55; H, 6.99; Cl, 10.81; N, 4.29.

The ether was removed from the above hydrolysate by distillation and the residue distilled to give N,α-dibenzylfurfurylamine, BP. 132–139° C./0.04 mm.

*Anal.*—Calcd. for C₁₉H₁₉NO: N, 5.05. Found: N, 5.00.

The free base was converted to the hydrochloride salt by addition of hydrochloric acid. The N,α-dibenzylfurfurylamine hydrochloride had the M.P. 196–200° C. (corr.).

*Anal.*—Calcd. for C₁₉H₂₀ClNO: C, 72.72; H, 6.42; N, 4.46. Found: C, 72.90; H, 6.81; N, 4.48.

(b) N,α-dibenzyltetrahydrofurfurylamine was prepared by hydrogenation of 44 g. of N,α-dibenzylfurfurylamine in 300 ml. of absolute ethanol according to the manipulative procedure described above in Example 1(b). The 34 g. of N,α-dibenzyltetrahydrofurfurylamine thus obtained had the B.P. 153–155° C./0.4 mm., $n_D^{25}$=1.5590.

*Anal.*—Calcd. for C₁₉H₂₃NO: C, 81.70; H, 8.30; N, 5.02. Found: C, 82.00; H, 7.92; N, 4.98.

EXAMPLE 4

α-Benzyltetrahydrofurfurylamine hydrochloride

A mixture of 50 g. of furfurylbenzyl ketone and 35 g. of benzylamine in 700 ml. of methanol was hydrogenated over Raney nickel at 150° C. and at a pressure of 1500 p.s.i. The catalyst was removed by filtration and the solvent removed by vacuum distillation. The oily residue was taken up in ether, the ether solution washed with dilute hydrochloric acid and the aqueous layer separated. Addition of 150 ml. of 35% sodium solution caused the separation of an oil which was taken up in ether. Removal of the ether by evaporation followed by distillation of the residue gave 19.7 g. of α-benzyltetrahydrofurfurylamine, B.P. 95–98° C./0.07 mm.

The free base was taken up in ether and 12.5 ml. of 8 N alcoholic hydrochloride acid added. The salt which separated was collected by filtration then recrystallized twice from acetonitrile. There was thus obtained α-benzyltetrahydrofurfurylamine hydrochloride, M.P. 175–176° C. (corr.).

*Anal.*—Calcd. for C₁₇H₁₈ClNO: C, 63.29; H, 7.97; Cl, 15.57. Found: C, 63.33; H, 7.86; Cl, 15.70.

The following compounds illustrative of the invention were prepared using the general procedures described above:

N-methyl-α-(2-phenylethyl)tetrahydrofurfurylamine hydrochloride, M.P. 103–115° C. (corr.) by hydrogenation of N-methyl-α-(2-phenylethyl)furfurylamine, B.P. 95–96° C./0.04 mm., [nitrate salt, M.P. 84–86° C. (corr.)], followed by reaction with ethereal hydrochloric acid.

N - methyl-α-(4-chlorobenzyl)tetrahydrofurfurylamine hydrochloride, M.P. 184–192° C. (corr.) by hydrogenation of N-methyl-α-(4-chlorobenzyl)furfurylamine, [hydrochloride salt, M.P. 158–160° C. (corr.)], followed by reaction with ethereal hydrochloric acid.

N - methyl - α-(1-phenylethyl)tetrahydrofurfurylamine, B.P. 82–85° C./0.02 mm. by hydrogenation of N-methyl-α-(1-phenylethyl)furfurylamine, B.P. 87–88° C./0.06 mm.

N-methyl-α-(4-methoxybenzyl)tetrahydrofurfurylamine hydrochloride, M.P. 161–164° C. (corr.) by hydrogenation of N - methyl - α-(4-methoxylbenzyl)furfurylamine, B.P. 108–120° C./0.012 mm. [hydrochloride salt, 136–141° C. (corr.)], followed by reaction with ethereal hydrochloric acid.

N - ethyl - α-benzyltetrahydrofurfurylamine, B.P. 101° C./0.07 mm. by hydrogenation of N-ethyl-α-benzylfurfurylamine [hydrochloride salt, M.P. 179–181° C. (corr.)].

N - ethyl-α-(4-nitrobenzyl)tetrahydrofurfurylamine hydrochloride, M.P. 228–232° C. (corr.) by nitration of N-ethyl-α-benzyltetrahydrofurfurylamine.

N - methyl - α - (1-naphthylmethyl)tetrahydrofurfurylamine hydrochloride, M.P. 156–159° C. (corr.) by hydrogenation of N-methyl-α-(1-naphthylmethyl)furfurylamine [hydrochloride salt, M.P. 207–209° C. (corr.)], followed by reaction with ethereal hydrochloric acid.

N-methyl-α-benzyltetrahydrofurfurylamine, B.P. 103–104° C./0.75 mm. by hydrogenation of N-methyl-α-benzylfurfurylamine, B.P. 86–87° C./0.5 mm.

N - methyl-α-(2-chlorobenzyl)tetrahydrofurfurylamine, B.P. 114–115° C./0.03 mm. by hydrogenation of N-methyl - α - (2-chlorobenzyl)furfurylamine, B.P. 92–93° C./0.09 mm. [hydrochloride salt M.P. 141–143° C. (corr.)].

N - methyl-α-(4-methylbenzyl)tetrahydrofurfurylamine, B.P. 99° C./0.09 mm. by hydrogenation of N-methyl-α-(4-methylbenzyl)furfuylamine, B.P. 81–83° C./0.08 mm.

N-ethyl-α-(3-chlorobenzyl)tetrahydrofurfurylamine hydrochloride, M.P. 166–168° C. (corr.) by hydrogenation of N-ethyl-α-(3-chlorobenzyl)furfurylamine.

N - propyl-α-benzyltetrahydrofurfurylamine, B.P. 100–102° C./0.16 mm. by hydrogenation of N-propyl-α-benzylfurfurylamine, B.P. 99–104° C./0.28 mm.

N - (2-methoxyethyl)-α-benzyltetrahydrofurfurylamine,

B.P. 140° C./0.85 mm. by hydrogenation of N-(2-methoxyethyl) - α - benzylfurfurylamine [hydrochloride salt, M.P. 115–117° C. (corr.)].

N-methyl-α-(4 - fluorophenyl)tetrahydrofurfurylamine, B.P. 81° C./0.2 mm. by hydrogenation of N-methyl-α-(4-fluorophenyl)furfurylamine, B.P. 86–90° C./0.5 mm.

N-methyl-α-(4 - fluorobenzyl)tetrahydrofurfurylamine, B.P. 110–113° C./0.4 mm. by hydrogenation of N-methyl-α-(4-fluorobenzyl)furfurylamine, B.P. 104–105° C./0.06 mm.

N-methyl - α - (3 - methylbenzyl)tetrahydrofurfurylamine, B.P. 98° C./0.9 mm. by hydrogenation of N-methyl-α-(3-methylbenzyl)furfurylamine, B.P. 98° C./0.36 mm.

N - methyl - α - (2 - methylbenzyl)tetrahydrofurfurylamine, B.P. 97° C./0.09 mm. by hydrogenation of N-methyl-α-(2-methylbenzyl)furfurylamine, B.P. 95–99° C./0.1 mm.

N-methyl - α - cyclohexyltetrahydrofurfurylamine, B.P. 68–73° C./0.1 mm. by hydrogenation of N-methyl-α-cyclohexylfurfurylamine, B.P. 66–68° C./0.07 mm.

N-ethyl - α - (3,4 - dichlorobenzyl)tetrahydrofurfurylamine, B.P. 126–132° C./0.03 mm. by hydrogenation of N-ethyl-α-(3,4-dichlorobenzyl)furfurylamine [hydrochloride salt, M.P. 194–197° C. (corr.)].

N - isopropyl - α - benzyltetrahydrofurfurylamine, B.P. 102° C./0.06 mm. by hydrogenation of N-isopropyl-α-benzylfurfurylamine, B.P. 90–92° C./0.14 mm.

N-cyclopropyl - α - benzyltetrahydrofurfurylamine, B.P. 98–102° C./0.2 mm. by hydrogenation of N-cyclopropyl-α-benzylfurfurylamine.

N-ethyl - α - (4 - aminobenzyl)tetrahydrofurfurylamine hydrochloride, M.P. 251–257° C. by hydrogenation of N-ethyl-α-(4-nitrobenzyl)tetrahydrofurfurylamine.

The procedures of general applicability discussed above can be used to prepare the following compounds:

N-(2-chlorobenzyl)-α - benzyltetrahydrofurfurylamine by hydrogenation of N-(2-chlorobenzyl) - α - benzylfurfurylamine.

N-n-hexyl - α - (2 - propoxybenzyl)tetrahydrofurfurylamine by hydrogenation of N-n-hexyl - α - (2 - propoxybenzyl)furfurylamine.

N-cycloheptyl-α-(3 - bromophenyl)tetrahydrofurfurylamine by hydrogenation of N-cycloheptyl - α - (3 - bromophenyl)furfurylamine.

N-(3,4-dimethoxybenzyl)-α - phenyltetrahydrofurfurylamine by hydrogenation of N-(3,4-dimethoxybenzyl)-α-phenylfurfurylamine.

N-ethyl-N-butyl - α - phenyltetrahydrofurfurylamine by hydrogenation of N-ethyl-N-butyl-α-phenylfurfurylamine.

α-(β-Naphthylmethyl)tetrahydrofurfurylamine by hydrogenation of α-(β-naphthylmethyl)furfurylamine.

N-amyl-α - (2 - iodobenzyl)tetrahydrofurfurylamine by hydrogenation of N-amyl-α-(2-iodobenzyl)furfurylamine.

N-(3-methylbenzyl)-N-ethyl - α - benzyltetrahydrofurfurylamine by hydrogenation of N-(3-methoxybenzyl)-N-ethyl-α-benzylfurfurylamine prepared by alkylation of N-(3 - methoxybenzyl)-α-benzylfurfurylamine with ethyl bromide.

N-(1-methylpropyl) - α - (3,4 - dimethoxybenzyl)tetrahydrofurfurylamine by hydrogenation of N-(1-methylpropyl)-α-(3,4-dimethoxybenzyl)furfurylamine.

N-methyl-α - (2,5 - dimethylphenyl)tetrahydrofurfurylamine by hydrogenation of N-methyl-α-(2,5-dimethylphenyl)furfurylamine.

It will be appreciated that the compounds of the invention contain asymmetric carbon atoms and hence can exist in stereochemically isomeric forms. If desired, the isolation or the production of a particular stereochemical form can be accomplished by application of the general principles known in the prior art. Included among the compounds prepared utilizing conventional separation and/or resolution procedures are:

dl-Threo-N-ethyl-α-benzyltetrahydrofurfurylamine hydrochloride, M.P. 151–152° C. (corr.).

d-Threo-N-ethyl-α - benzyltetrahydrofurfurylamine hydrochloride, M.P. 125–126° C. (corr.), $[\alpha]_D^{25} = +6.7°$ (1% in acetic acid).

l-threo-N-ethyl - α - benzyltetrahydrofurfurylamine hydrochloride, M.P. 127–129° C. (corr.), $[\alpha]_D^{25} = -7.4°$ (1% in acetic acid).

dl-Erythro-N-ethyl - α - benzyltetrahydrofurfurylamine hydrochloride, M.P. 160–161° C. (corr.).

l-erythro-N-ethyl-α-benzyltetrahydrofurfurylamine hydrochloride, M.P. 116–118° C. (corr.), $[\alpha]_D^{25} = -12.3°$ (1% in acetic acid); levo tartrate salt, M.P. 133–135° C. (corr.).

d-Erythro-N-ethyl-α-benzyltetrahydrofurfurylamine hydrochloride, M.P. 130–131° C. (corr.).; d-tartrate salt, M.P. 134–135° C.

dl-Threo-N-methyl - α - benzyltetrahydrofurfurylamine hydrochloride, M.P. 156–162° C. (corr.).

dl-Erythro-N-methyl-α - benzyltetrahydrofurfurylamine hydrochloride, M.P. 179–180° C. (corr.).

l-erythro-N-methyl-α - benzyltetrahydrofurfurylamine, B.P. 87–88° C./0.08 mm., $[\alpha]_D^{25} = -27.6°$ (1% in acetic acid).

d-Erythro-N-methyl-α - benzyltetrahydrofurfurylamine, B.P. 94–97° C./0.04 mm., $[\alpha]_D^{25} = +23.4°$ (1% in acetic acid).

I claim:
1. N-methyl-α-(4-fluorophenyl)furfurylamine.
2. N-methyl-α-(4-chlorobenzyl)furfurylamine.
3. N-methyl-α-(4-methoxybenzyl)furfurylamine.

References Cited by the Examiner
UNITED STATES PATENTS
2,676,964  4/54  Sperber et al. _____ 260—296
FOREIGN PATENTS
963,424  5/57  Germany.

NICHOLAS S. RIZZO, *Primary Examiner*.